United States Patent
Prebble

(10) Patent No.: US 11,069,043 B1
(45) Date of Patent: Jul. 20, 2021

(54) BACKGROUND NOISE REDUCTION USING A VARIABLE RANGE OF COLOR VALUES DEPENDENT UPON THE INITIAL BACKGROUND COLOR DISTRIBUTION

(71) Applicant: Konica Minolta Business Solutions U.S.A., Inc., San Mateo, CA (US)

(72) Inventor: Tim Prebble, Longmont, CO (US)

(73) Assignee: Konica Minolta Business Solutions U.S.A., Inc., San Mateo, CA (US)

(*) Notice: Subject to any disclaimer, the term of this patent is extended or adjusted under 35 U.S.C. 154(b) by 0 days.

(21) Appl. No.: 16/818,089

(22) Filed: Mar. 13, 2020

(51) Int. Cl.
  *G06T 5/40* (2006.01)
  *G06T 5/00* (2006.01)
  *G06K 9/38* (2006.01)

(52) U.S. Cl.
  CPC .................. *G06T 5/40* (2013.01); *G06K 9/38* (2013.01); *G06T 5/002* (2013.01)

(58) Field of Classification Search
  CPC ........ G06T 5/00–002; G06T 5/40; G06K 9/38
  See application file for complete search history.

(56) References Cited

U.S. PATENT DOCUMENTS

| | | | | |
|---|---|---|---|---|
| 6,222,642 B1* | 4/2001 | Farrell | ...................... | G06K 9/38 358/1.9 |
| 6,807,301 B1* | 10/2004 | Tanaka | .................. | H04N 1/4074 358/516 |
| 9,204,011 B1* | 12/2015 | Zheng | .................... | H04N 1/409 |
| 9,274,693 B2* | 3/2016 | Moore | .................. | G06T 11/001 |
| 2001/0053248 A1* | 12/2001 | Maeda | ...................... | G06K 9/38 382/165 |
| 2003/0063814 A1* | 4/2003 | Herley | ............... | H04N 1/19568 382/255 |
| 2004/0085591 A1 | 5/2004 | Huang et al. | | |
| 2008/0181497 A1* | 7/2008 | Ferman | .................... | G06T 7/136 382/172 |
| 2009/0323089 A1* | 12/2009 | Hayasaki | ............... | H04N 1/644 358/1.9 |
| 2010/0246947 A1* | 9/2010 | Ma | ........................... | G06K 9/38 382/167 |
| 2010/0328727 A1* | 12/2010 | Ohara | ................... | H04N 1/3873 358/3.01 |
| 2011/0026814 A1* | 2/2011 | Nuuja | ...................... | G06T 7/194 382/164 |
| 2011/0222769 A1* | 9/2011 | Galic | ................... | G06K 9/00456 382/173 |
| 2013/0004066 A1* | 1/2013 | Butler | .................. | H04N 1/6027 382/165 |

(Continued)

*Primary Examiner* — Sean T Motsinger
(74) *Attorney, Agent, or Firm* — Osha Bergman Watanabe & Burton LLP

(57) ABSTRACT

A method to reduce background noise in a document image. The method includes extracting, from the document image, a connected component corresponding to a background of the document image, generating a histogram of pixel values of the connected component, generating, using a non-linear mapping function based on the histogram, a non-linear probability distribution of the pixel values in the connected component, generating, based at least on a comparison between the non-linear probability distribution and a predetermined threshold, a replacement range of the pixel values, selecting, from the connected component, a pixel having a pixel value within the replacement range, and converting the pixel value of the pixel to a uniform background color.

20 Claims, 5 Drawing Sheets

(56) References Cited

U.S. PATENT DOCUMENTS

| | | | |
|---|---|---|---|
| 2013/0243321 A1* | 9/2013 | Shimazaki | G06K 9/38 |
| | | | 382/170 |
| 2014/0185104 A1* | 7/2014 | Hasegawa | H04N 1/38 |
| | | | 358/452 |
| 2015/0106755 A1* | 4/2015 | Moore | G06F 40/166 |
| | | | 715/765 |
| 2015/0256713 A1* | 9/2015 | Booth | G06K 9/38 |
| | | | 358/466 |
| 2017/0163882 A1* | 6/2017 | Piramuthu | G06K 9/38 |
| 2017/0256058 A1* | 9/2017 | Seo | G06T 7/13 |
| 2020/0106925 A1* | 4/2020 | Takasu | G06T 5/30 |
| 2020/0371337 A1* | 11/2020 | Dohi | G02B 21/365 |
| 2020/0389625 A1* | 12/2020 | Mukhopadhyay | G06T 7/246 |

\* cited by examiner

BACKGROUND NOISE REDUCTION USING A VARIABLE RANGE OF COLOR VALUES DEPENDENT UPON THE INITIAL BACKGROUND COLOR DISTRIBUTION

BACKGROUND

Document scanners and camera devices capture images of documents (herein referred to as "document images"). In such document images, image noise generated by image sensors and circuitry of the document scanners and camera devices exists as random variation of brightness or color information.

The background of a document image is a portion that excludes data objects (e.g., text, graphics, charts, tables, pictures, and/or other embedded contents) of the document image. Specifically, in document images, the background and the data objects are mutually exclusive portions where the data objects are defined as non-background content. Background noise exists as image noise in the background of these document images.

SUMMARY

In general, in one aspect, the invention relates to a method to reduce background noise in a document image. The method includes extracting, by a computer processor and from the document image, a connected component corresponding to a background of the document image, generating, by the computer processor, a first histogram of pixel values of the connected component, generating, by the computer processor using a non-linear mapping function based on the first histogram, a first non-linear probability distribution of the pixel values in the connected component, generating, based at least on a comparison between the first non-linear probability distribution and a predetermined threshold, a first replacement range of the pixel values, selecting, from the connected component, a first pixel having a first pixel value within the first replacement range, and converting the first pixel value of the first pixel to a uniform background color.

In general, in one aspect, the invention relates to a system for reducing background noise in a document image. The system includes a memory, and a computer processor connected to the memory and that extracts, from the document image, a connected component corresponding to a background of the document image, generates a first histogram of pixel values of the connected component, generates, using a non-linear mapping function based on the first histogram, a first non-linear probability distribution of the pixel values in the connected component, generates, based at least on a comparison between the first non-linear probability distribution and a predetermined threshold, a first replacement range of the pixel values, selects, from the connected component, a first pixel having a first pixel value within the first replacement range, and converts the first pixel value of the first pixel to a uniform background color.

In general, in one aspect, the invention relates to a non-transitory computer readable medium storing computer readable program code for reducing background noise in a document image. The computer readable program code, when executed by a computer, comprises functionality for extracting, from the document image, a connected component corresponding to a background of the document image, generating a first histogram of pixel values of the connected component, generating, using a non-linear mapping function based on the first histogram, a first non-linear probability distribution of the pixel values in the connected component, generating, based at least on a comparison between the first non-linear probability distribution and a predetermined threshold, a first replacement range of the pixel values, selecting, from the connected component, a first pixel having a first pixel value within the first replacement range, and converting the first pixel value of the first pixel to a uniform background color.

Other aspects of the invention will be apparent from the following description and the appended claims.

DETAILED DESCRIPTION

Figure 1:
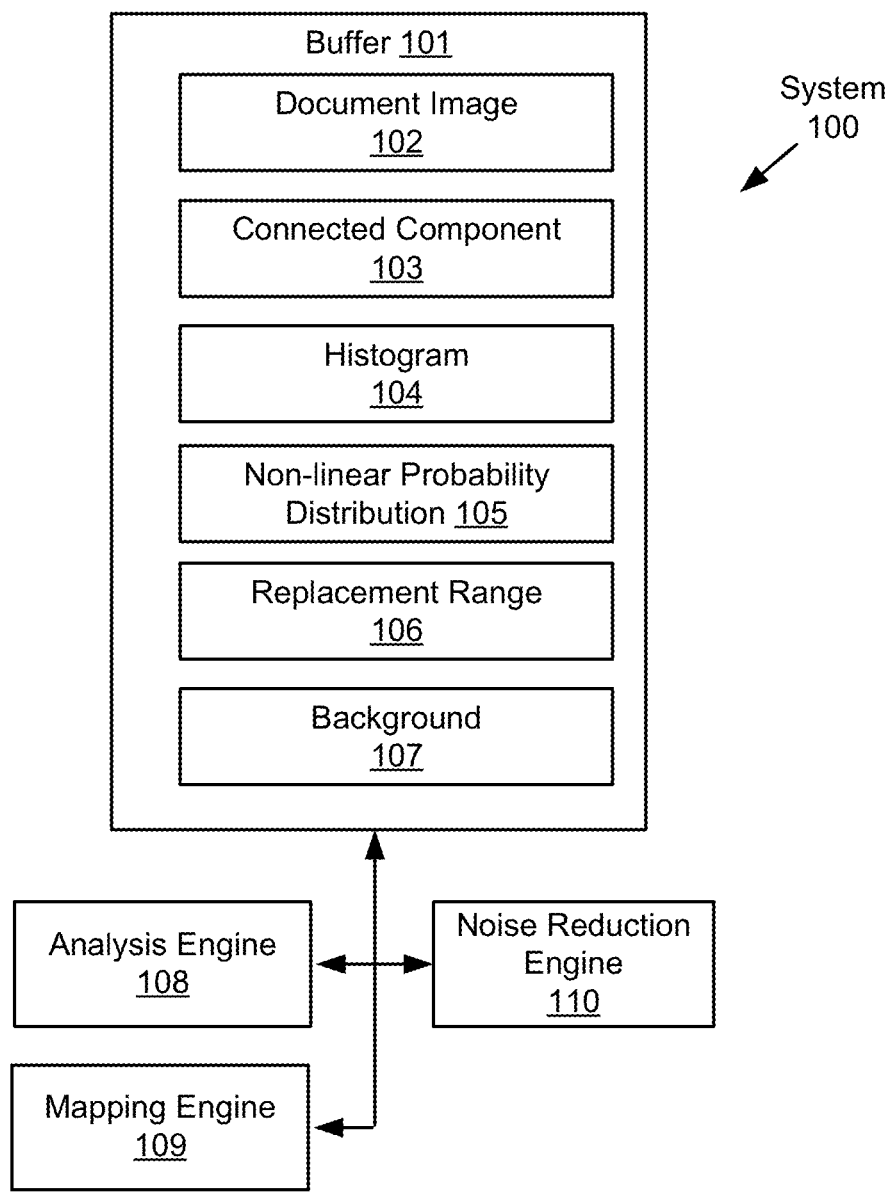
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to reduce visual background noise in images (especially in images of document pages) in a manner such that noisier backgrounds are more aggressively cleaned than cleaner backgrounds.

In an example implementation of one or more embodiments, a connected component corresponding to a background of a document image is extracted from the document image, a histogram of pixel values of the connected component is generated, a non-linear probability distribution of the pixel values in the connected component is generated using a non-linear mapping function based on the histogram, a replacement range of the pixel values is generated based at least on a comparison between the non-linear probability distribution and a predetermined threshold, a pixel having a pixel value within the replacement range is selected from the connected component, and the pixel value of the pixel is converted to a uniform background color.

FIG. 1 shows a system (100) in accordance with one or more embodiments of the invention. As shown in FIG. 1, the system (100) has multiple components, including, for example, a buffer (101), an analysis engine (108), a mapping engine (109), and a noise reduction engine (110). Each of these components (101, 108, 109, 110) may be located on the same computing device (e.g., personal computer (PC), laptop, tablet PC, smart phone, multifunction printer, kiosk, server, etc.) or on different computing devices connected by a network of any size having wired and/or wireless segments. In one or more embodiments, these components may be implemented using the computing system (400) described below in reference to FIG. 4. Each of these components is discussed below.

In one or more embodiments, the buffer (101) may be implemented in hardware (i.e., circuitry), software, or any combination thereof. The buffer (101) is configured to store a document image (102). The document image (102) is an image of a physical document and may be captured from a physical document using a camera device or a document scanner. The physical document may include one or more lines of text made up of characters that are hand-written, typed, and/or printed. The physical document may also include non-text objects such as graphics, charts, tables, pictures, and/or other embedded contents.

The document image (102) may be part of a collection of document images that are processed by the system (100) to generate intermediate and final results. Further, the document image (102) may be of any size and in any image format (e.g., BMP, JPEG, TIFF, PNG, etc.). The document image (102) includes one or more foreground objects corresponding to the text, graphics, charts, tables, pictures, and/or other embedded contents of the physical document. All portions of the document image (102) excluding the foreground objects are considered the background of the document image (102). The document image (102) includes certain amounts of image noise, which is a random variation of brightness or color information in the document image (102). The image noise may be produced by the image sensor and circuitry of the document scanner or digital camera used to generate the document image (102). The portion of the image noise present in the background (107) is referred to as background noise.

The buffer (101) is further configured to store the intermediate and final results of the system (100) that are directly or indirectly derived from the document image (102). The intermediate and final results include at least a connected component (103), a histogram (104), a non-linear probability distribution (105), a replacement range (106), and a background (107), which are described in more detail below.

In one or more embodiments of the invention, the analysis engine (108) may be implemented in hardware (i.e., circuitry), software, or any combination thereof. The analysis engine (108) performs an extraction operation of the document image (102) to extract the connected component (103) corresponding to a background of the document image (102). The connected component (103) is among a number of connected components extracted by the analysis engine (108) from the document image (102). The extraction operation include a thresholding operation which produces a binary mask, and a connected component analysis operation which takes the binary mask as input and outputs a "label image". The label image identifies connected components on a pixel-by-pixel basis. Each of the connected components is a cluster of pixels with the same label after applying the extraction operation to the document image (102). The thresholding operation generates the binary mask of the document image (102) based on a comparison between the pixel value and a threshold value. For example, the pixels having pixel values greater than or equal to the threshold value are marked in the binary mask while other pixels having pixel values less than the threshold value are unmarked in the binary mask.

The connected component analysis operation analyses the binary mask to identify geometrically contiguous regions of marked pixels. Each geometrically contiguous region of marked pixels within the binary mask is identified as a connected component and assigned an unique label. Specifically, the analysis engine (108) extracts the connected component (103) such that all pixels within the geometrically contiguous region have the same assigned label.

In one or more embodiments of the invention, the analysis engine (108) compares a dimension of the document image (102) to the connected components to generate a comparison result. Accordingly, the connected component (103) is selected, based on the comparison result, from the number of connected components as a connected component that corresponds to the background of the document image (102). For example, the connected component (103) is selected based on closest matching of the height and width of each connected component and that of the document image (102). In other words, the height and width of the connected component (103) match the height and width of the document image (102) with a least amount of difference than any other connected components.

Once the connected component (103) is extracted from the document image (102), the analysis engine (108) generates a histogram (104) of pixel values of the connected component (103). The histogram (104) is a statistical distribution of the pixel values. Specifically, the histogram (104) includes a pixel count for each pixel value present in the connected component (103). The pixel count in the histogram (104) for a particular pixel value is the total number of pixels in the connected component (103) that have that particular pixel value. The dominant pixel value is the pixel value that corresponds to a maximum pixel count in the histogram (104). In mathematical terms, the dominant pixel value is the mode of the histogram (104). For scenarios where the physical document has a uniform background, the histogram (104) exhibits a well-defined peak shape centered around the mode. Accordingly, the analysis engine (108) identifies the dominant pixel value in the histogram (104) as the uniform background color.

In one or more embodiments, the analysis engine (108) performs the functions described above using the method described below in reference to FIG. 2. An example of the document image (102) and the connected component (103) is shown in FIG. 3A below.

In one or more embodiments of the invention, the mapping engine (109) may be implemented in hardware (i.e., circuitry), software, or any combination thereof. The mapping engine (109) generates a non-linear probability distribution (105) of the pixel values in the connected component (103). The non-linear probability distribution (105) is a function that assigns probabilities to the pixel values. Specifically, the mapping engine (109) generates the non-linear probability distribution (105) using a non-linear mapping function based on the histogram (104). The non-linear mapping function maps the pixel count of each pixel value in the histogram (104) to a corresponding probability of the pixel value in the non-linear probability distribution (105). The non-linear mapping function defines a non-linear relationship between the pixel count in the histogram (104) and the corresponding probability in the non-linear probability distribution (105). For example, the non-linear relationship may be an exponential relationship where the probability assigned to a pixel value is an exponential function with the exponent including the pixel count of the pixel value.

In one or more embodiments, the mapping engine (109) performs the functions described above using the method described below in reference to FIG. 2. Examples of the histogram (104) and corresponding non-linear probability distribution (105) are described below in reference to TABLE 1 and TABLE 2 below.

In one or more embodiments, the noise reduction engine (110) may be implemented in hardware (i.e., circuitry), software, or any combination thereof. The noise reduction engine (110) generates, based on a comparison between the non-linear probability distribution (105) and a predetermined threshold, a replacement range (106) of the pixel values in the connected component (103). Specifically, the replacement range (106) includes an upper bound and a lower bound that enclose a portion of the non-linear probability distribution (105) based on the predetermined threshold. In one or more embodiments, the probabilities are normalized such that the sum of all probabilities of all pixel values equals 100%. In such embodiments, the predetermined threshold is a percentage threshold, such as 99%.

Accordingly, the noise reduction engine (110) generates the replacement range (106) such that the sum of all probabilities of all pixel values within the upper bound and the lower bound equals the predetermined percentage threshold. The noise reduction engine (110) selects, from the connected component (103), any pixel having a pixel value within the upper bound and the lower bound of the replacement range (106). All selected pixels from the connected component (103) collectively form the background (107). In other words, any pixel in the connected component (103) that is not selected by the noise reduction engine (110) is excluded from the background (107). In particular, the unselected pixels are identified as belonging to the foreground objects of the document image (102). To reduce background noise, the noise reduction engine (110) converts the pixel value of each selected pixel to the uniform background color that is identified by the analysis engine (108) above. In other words, the noise reduction engine (110) generates a noise reduced (i.e., cleaned) version of the document image (102) where the noise in the background (107) are replaced by the uniform background color. In the original version of the document image (102), pixels in the background (107) have pixel values varying throughout the replacement range (106). In contrast, in the noised reduced (i.e., cleaned) version of the document image (102), all pixels in the background (107) have the same pixel value that corresponds to the uniform background color.

In one or more embodiments, the noise reduction engine (110) performs the functions described above using the method described below in reference to FIG. 2. An example of the replacement range (106) and the noise reduced version of the document image (102) are described below in reference to TABLE 1, TABLE 2, and FIG. 3B below.

Although the system (100) is shown as having four components (101, 108, 109, 110), in one or more embodiments of the invention, the system (100) may have more or fewer components. Furthermore, the functions of each component described above may be split across components. Further still, each component (101, 108, 109, 110) may be utilized multiple times to carry out an iterative operation.

Figure 2:
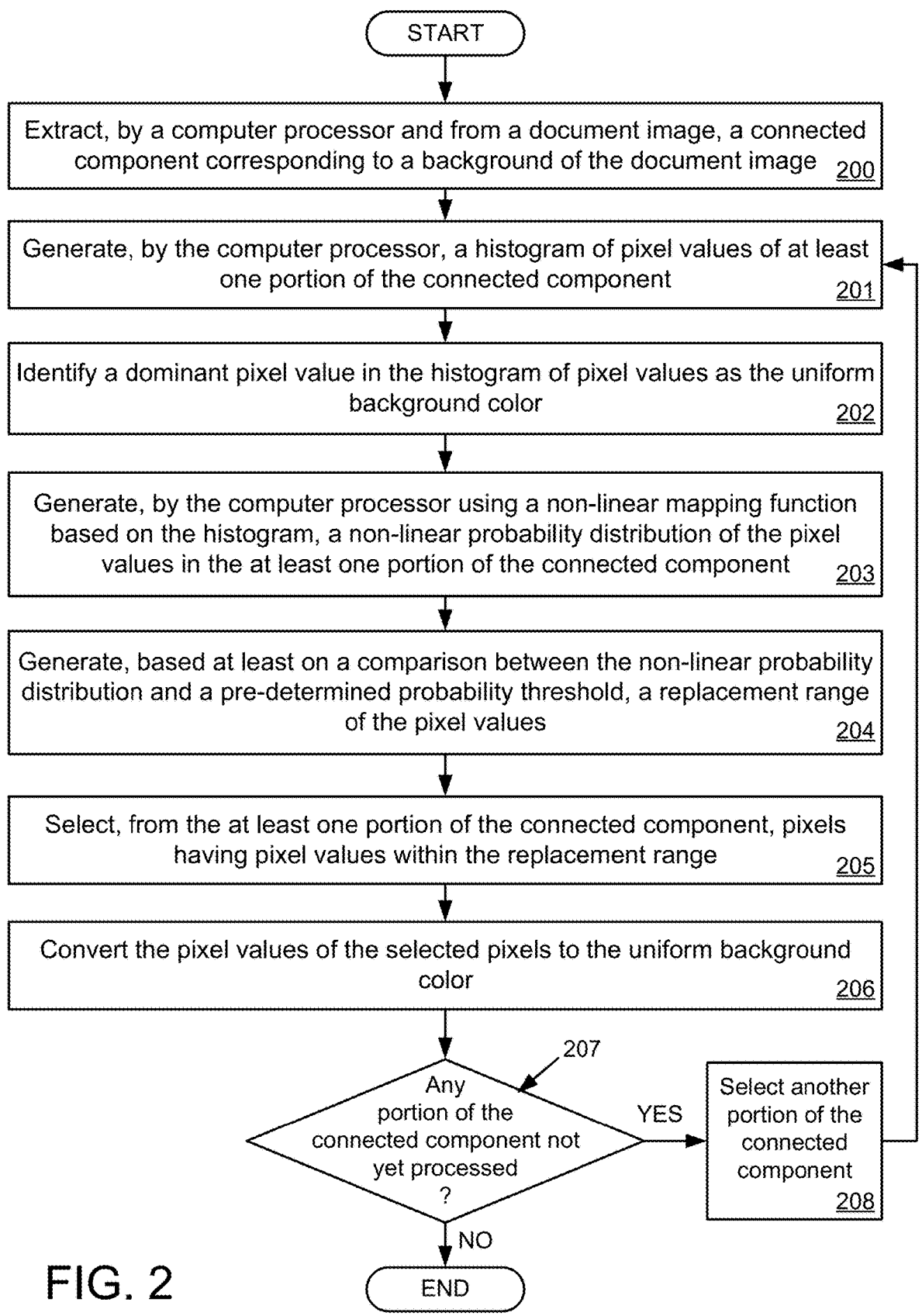
FIG. 2 shows a flowchart in accordance with one or more embodiments of the invention.
Figure 3A:
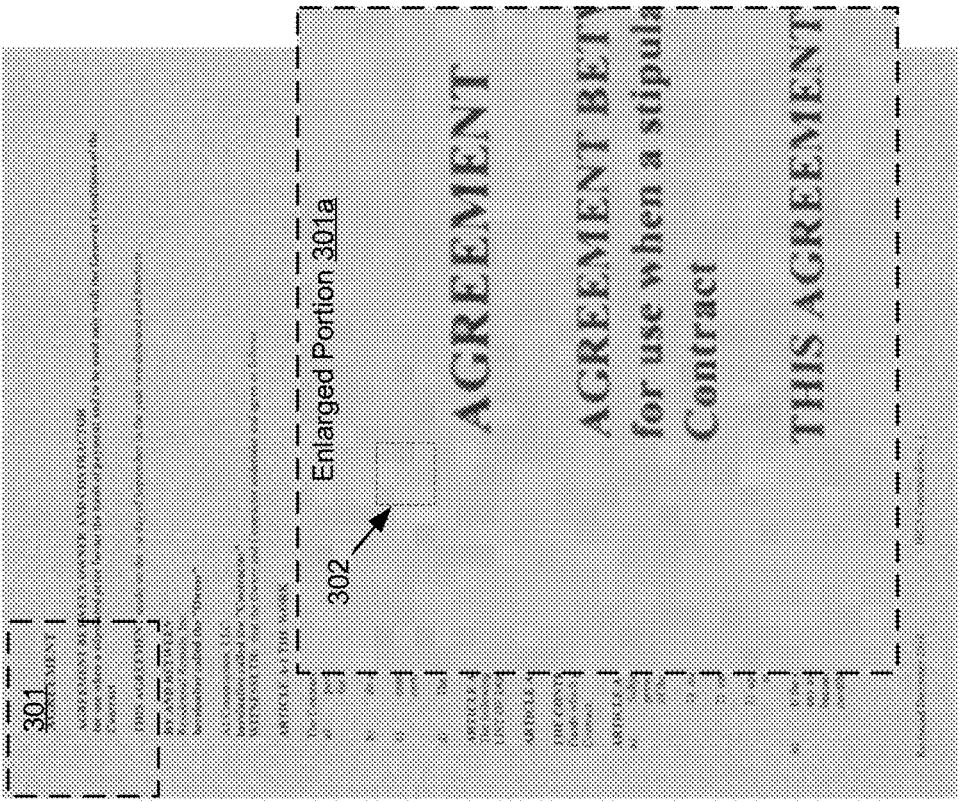
FIGS. 3A-3B show an implementation example in accordance with one or more embodiments of the invention.

FIG. 2 shows a flowchart in accordance with one or more embodiments of the invention. One or more of the steps in FIG. 2 may be performed by the components of the system (100), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 200, according to one or more embodiments, a connected component corresponding to a background of the document image is extracted from the document image by a computer processor. In one or more embodiments, a number of connected components are first extracted from the document image. The connected component corresponding to the background is selected from these connected components based on a comparison result of comparing a dimension of the document image to each of the connected components. The particular connected component that has closest match to the dimension (e.g., height and width) of the document image is selected as corresponding to the background.

The connected component having close match to the dimension (e.g., height and width) of the document image is readily identifiable when the background is a single color, with the exception of the noise. When a natural image constitutes the background, the connected component corresponding to the entire background, including the natural image, may not be found. In that case, no background cleaning is performed as it is advantageous to leave the natural image alone without cleaning. Specifically, subsequent Steps 201 through 208 are omitted when the connected component corresponding to the entire background is not found.

In Step 201, a histogram of pixel values of at least one portion of the connected component (as selected above in Step 200) is generated by the computer processor. In one or more embodiments, the histogram includes all pixels of the connected component. In such embodiments, Steps 201 through 206 are performed once to reduce the background noise. Alternatively, the connected component may be divided into multiple portions where the histogram includes pixels of one portion of the connected component. In such alternative embodiments, Steps 201 through 206 may be iteratively performed to reduce the background noise in each of the portions of the connected component.

In Step 202, a dominant pixel value in the histogram of pixel values is identified as the uniform background color. Specifically, the histogram is analyzed to find a maximum pixel count where the corresponding pixel value is identified as the dominant pixel value that is used as the uniform background color in Step 206 below.

In Step 203, a non-linear probability distribution of the pixel values in the at least one portion of the connected component is generated by the computer processor. The non-linear probability distribution is generated using a non-linear mapping function based on the histogram. Specifically, the non-linear probability distribution is generated by applying the non-linear mapping function to each pixel count in the histogram of the pixel values.

In Step 204, a replacement range of the pixel values is generated based at least on a comparison between the non-linear probability distribution and a predetermined threshold. In one or more embodiments, the comparison identifies, based on the predetermined threshold, a portion of the non-linear probability distribution bounded by two pixel values on two separate sides of the dominant pixel value. The two pixel values define the upper bound and the lower bound of the replacement range. In one or more embodiments, the probabilities are normalized such that the sum of all probabilities of all pixel values equals 100%. In such embodiments, the predetermined threshold is a percentage threshold, such as 99%. Accordingly, the replacement range is generated such that the sum of all probabilities of all pixel values within the upper bound and the lower bound equals the predetermined percentage threshold. In one or more embodiments, subsequent to generating the replacement range, any pixel value with probability less than a minimum threshold (e.g., 0.001) are discarded from the replacement range. Accordingly, the replacement range is modified by discarding pixel values within the replacement range that have probabilities less than the minimum threshold (e.g., 0.001). Specifically, starting with pixel values at the upper and lower bounds of the replacement range and working toward the dominant pixel value (i.e., peak), stopping when the first pixel value is encountered with a probability greater than or equal to the minimum threshold (e.g., 0.001). Starting from the upper bound toward the peak, the first pixel value with a probability greater than or equal to the minimum threshold (e.g., 0.001) is used as the modified upper bound. Similarly, starting from the lower bound toward the peak, the first pixel value with a percentage or probability greater than or equal to the minimum threshold (e.g., 0.001) is used as the modified lower bound. By discarding low probability pixel values, the replacement ranged is reduced to the width of the peak defined by the modified upper and lower bounds.

In Step 205, pixels having pixel values within the replacement range are selected from the at least one portion of the connected component. In the embodiments where the histogram includes all pixels of the connected component, the selected pixels collectively form the background of the document image. In the embodiments where the connected component is divided into multiple portions where the histogram includes pixels of one portion of the connected component, the selected pixels are iteratively added into the background.

In Step 206, pixel values of the selected pixels are converted to the uniform background color identified in Step 202 above.

In Step 207, a determination is made as to whether any portion of the connected component has not been processed in Steps 201 through 206 above. If the determination is positive, i.e., at least one portion remains to be processed, the method proceeds to Step 208 where another portion of the connected component is selected for processing before the method returning to Step 201. If the determination is negative, i.e., no portion of the connected component remains to be processed, the method ends.

Figure 3B:

FIGS. 3A-3B show an implementation example in accordance with one or more embodiments of the invention. The implementation example shown in FIGS. 3A-3B is based on the system and method flowchart described in reference to FIGS. 1 and 2 above. In one or more embodiments of the invention, one or more elements shown in FIGS. 3A-3B may be omitted, repeated, and/or organized in a different arrangement. Accordingly, the scope of the invention should not be considered limited to the specific arrangement of elements shown in FIGS. 3A-3B.

In the example shown in FIGS. 3A-3B below, the document image is the image of a single page document. Removing noise from the background of the document image improves quality (e.g., legibility) of the document image and, as a result, quality of the printed or displayed outputs generated from the document image. As described above, the background noise corresponds to pixel values which differ from the dominant pixel value of the image background. Reducing background noise is by setting pixels which are determined as corresponding to "noise" to the dominant pixel value of the image background that results in a uniform background color.

A first task to remove background noise is to identify the background itself, i.e., distinguishing the (possibly noisy) background from non-background content. This can be especially challenging when dealing with images of document pages, such as scans of Microsoft Office documents or of PDFs, because of the variety of content which may be present on the document pages. For example, a document page may contain text of varying sizes, font styles, and colors, shapes with a variety of fills, tables, and natural images (i.e., photographs of real-world scenes). This wide diversity of content types manifests as a wide diversity of visual features, effectively producing a very complex description of content.

Distinguishing background noise from natural images is especially difficult due to the irregular pixel patterns (resembling noise) contained within natural images. Improperly applying noise reduction techniques to a document image containing natural images may degrade the natural image content.

Some document images contain more background noise than others. In the example below, the amount of noise reduction applied varies according to the amount of noise present in the document image. For example, larger extent of noise reduction is applied to noisier images to effectively reduce/remove the noise, while lesser extent of noise reduction is applied to cleaner images without degrading image content. The tradeoff is made to leave some noise in the document image instead of removing all the noise but, in the process, destroying meaningful content of the document image.

The amount of noise present in the document image is determined by the width of the distribution (e.g., histogram) of background color values. A narrower distribution indicates a cleaner image where less noise reduction is to be performed. In contrast, a wider distribution (i.e., with larger range of color values) indicates a dirtier image where more noise reduction is to be performed. Since noise reduction means overwriting the pixel values which fall within a specified range with a uniform background color, "more noise reduction" equates to increasing the size of that range—that is, replacing more color values with the uniform background color.

Determining which document image background pixels to replace with the uniform background color is based on a non-linear mapping function to exaggerate the peak of the histogram such that cleaner images are not overly cleaned.

FIG. 3A shows an example of the document image (102), the connected component (103), and the background (107) depicted in FIG. 1 above. In particular, the original input image (300) is an example of the document image (102) and the page background CC (310) is an example of the connected component (103). As shown in FIG. 3A, a portion (301) of the original input image (300) is magnified as the enlarged portion (301a) to show the visible color variations (e.g., represented as gray-scale tone variation (302)) as background noises. The gray-scale tone variation (302) includes multiple square pixels having different gray-scale tones. The page background CC (310) is shown as white portion of a binary mask where the black color is excluded from the page background CC (310).

Depending upon the content contained in the original input image (300), and the specific thresholding and connected component analysis methods used, the page background CC (310) may extend into areas which do not belong to the background. In other words, the page background CC (310) may include pixels which belong to content (e.g., along edges and into the interiors of natural images), rather than the background. Therefore, changing all pixel values of the page background CC (310) to a single value (i.e., the uniform background color) would likely destroy real content, in particular, if natural images are present. Instead, the replacement range is calculated as a range of pixel values (colors) which, with reasonable confidence, do belong to the background. An example of calculating the replacement range is described below.

In the example described here, the pixel values found in the page background CC (310) are expressed in the RGB (i.e., red/green/blue), CMY (i.e., cyan/magenta/yellow), or similar color-spaces. The pixel values are converted to HSL (i.e., hue/saturation/lightness) or other types of color-space, such as HSV (i.e., hue/saturation/value), CIELAB (i.e., color-space defined by International Commission on Illumination), etc. In particular, individual channels of HSL, HSV, or CIELAB are more independent (i.e., less correlated) than the channels of RGB or CMY color-spaces. Once converted, a histogram is generated for each of the three channels in the color-space. Each histogram includes the number of pixels for each pixel value [0, 255] in each channel. Each histogram contains a peak section, with the center of each peak section indicating a corresponding color component of the uniform background color.

For very clean images with less extent of noises, the majority of background pixels falls within the peak section, which dominates the histogram distribution. The peak section tends to be narrow, e.g., occupying a single color value. For dirtier images with more extensive noise, the background pixels are more distributed throughout the histogram distribution, where the peak section is less prominent (in terms of height), occupying multiple pixel values, and tends to be wider than the peak section of clean images An example method to calculate the replacement range based on the three histogram is described here. The pixel counts (i.e., the number of pixels for each color value or pixel value) in each histogram are first converted to percentages, expressed in the range of [0, 1]. Secondly, the percentages are linearly scaled (i.e., multiplied by a fixed scale factor, such as 10) to transform these percentages into scores. A non-linear function is then applied to the scores to map the scores into probabilities. An example non-linear function exponentiates and then normalizes the scores to generate the probabilities. The distribution of the resulting probabilities with respect to corresponding pixel values is an example of the non-linear probability distribution (105). The combination of percent-conversion, linear scaling, and non-linear function is an example of the non-linear mapping function described above.

Applying the non-linear function has the effect of exaggerating narrower peak section in the histogram, while leaving broader peak sections relatively unchanged. The replacement range is generated by comparing the distribution of the resulting probabilities to a percentage threshold. In the example where the pixel values are in HSL format, a pair of upper bound and lower bound in pixel values are generated for each of the three histograms of the hue, saturation, and lightness. In particular, an upper bound and lower bound of hue values are generated from the histogram of the hue values. An upper bound and lower bound of saturation values are generated from the histogram of the saturation values. An upper bound and lower bound of lightness values are generated from the histogram of the lightness values. Accordingly, the upper bound in the replacement range is a combination of the upper bounds of the hue, saturation, and lightness values. Similarly, the lower bound in the replacement range is a combination of the lower bounds of the hue, saturation, and lightness values. Since the probabilities in the peak section are much higher for a narrower peak section than for a broader peak section, the replacement range tends to be narrower for cleaner images than for dirtier images.

All pixels in the page background CC (310) having pixel values within the replacement range are grouped together to form the background. The pixel value of each pixel in the background is then set to the uniform background color to reduce the image noises.

TABLE 1 below shows an example histogram and non-linear probability distribution of one of the three channels for a relatively clean (i.e., less noisy) image. The first column in TABLE 1 corresponds to lightness values of the pixels in the connected component corresponding to the background. The histogram and non-linear probability distribution of saturation values or hue values has the same format. The second column in TABLE 1 corresponds to the aforementioned pixel counts or the number of occurrences. The third column in TABLE 1 corresponds to the aforementioned percentages. The fourth column in TABLE 1 corresponds to the aforementioned scores based on the scaling factor of 10. The fifth column in TABLE 1 corresponds to the aforementioned probabilities, which are generated by applying a non-linear mapping function to the scores.

Based on TABLE 1 and using 0.99 as the percentage threshold, the replacement range is computed under two conditions. In the first condition, the replacement range is computed without discarding pixels having probabilities less than 0.001. The width of the peak is computed as [97,255] based on the percentage distribution in the third column of TABLE 1, while the width of the peak is computed as [44,255] based on the probability distribution in the fifth column of TABLE 1. Specifically, [97,255] is the narrowest range within which the cumulative percentages of the percentage distribution is at least 0.99. In the same token, [44,255] is the narrowest range within which the cumulative probabilities of the probability distribution is at least 0.99.

In the second condition, the replacement ranges computed in the first condition are modified by discarding pixel values within the replacement range that have percentages or probabilities less than 0.001. Specifically, starting with pixel values at the upper and lower bounds of the replacement range and working toward the peak, stopping when the first pixel value is encountered with a percentage or probability greater than or equal to 0.001. Starting from the upper bound toward the peak, the first pixel value with a percentage or probability greater than or equal to 0.001 is used as the modified upper bound. Similarly, starting from the lower bound toward the peak, the first pixel value with a percentage or probability greater than or equal to 0.001 is used as the modified lower bound. By discarding low percentage/probability pixel values, the width of the peak defined by the modified upper and lower bounds is reduced from [97,255] to [130,255] based on the percentage distribution in the third column of TABLE 1, while the width of the peak defined by the modified upper and lower bounds is reduced from [44,255] to [255,255] based on the probability distribution in the fifth column of TABLE 1. Using the percentage distribution based noise reduction, pixel values within [130,255] are converted to 255. Such aggressive noise reduction may degrade actual content. Using the probability distribution based noise reduction, no pixels are selected for converting pixel values because the replacement range [255,255] is degenerated with the upper bound equaling the lower bound. In other words, using probability distribution based noise reduction reduces the risk of degrading content in the relatively clean (i.e., less noisy) image.

TABLE 1

| PIXEL VALUE | # OCCURRENCES | PERCENT [0,1] | SCORE | PROBABILITY |
|---|---|---|---|---|
| 20 | 32 | 9.75E−06 | 9.75E−05 | 0.000417131 |
| 22 | 8 | 2.44E−06 | 2.44E−05 | 0.0004171 |
| 23 | 12 | 3.65E−06 | 3.65E−05 | 0.000417105 |
| 24 | 14 | 4.26E−06 | 4.26E−05 | 0.000417108 |
| 25 | 28 | 8.53E−06 | 8.53E−05 | 0.000417125 |
| 26 | 48 | 1.46E−05 | 0.000146 | 0.000417151 |
| 27 | 71 | 2.16E−05 | 0.000216 | 0.00041718 |
| 28 | 81 | 2.47E−05 | 0.000247 | 0.000417193 |
| 29 | 106 | 3.23E−05 | 0.000323 | 0.000417225 |
| 30 | 139 | 4.23E−05 | 0.000423 | 0.000417266 |
| 31 | 153 | 4.66E−05 | 0.000466 | 0.000417284 |
| 32 | 325 | 9.90E−05 | 0.00099 | 0.000417503 |
| 33 | 70 | 2.13E−05 | 0.000213 | 0.000417179 |
| 34 | 408 | 0.000124253 | 0.001243 | 0.000417608 |
| 35 | 75 | 2.28E−05 | 0.000228 | 0.000417185 |
| 36 | 381 | 0.000116031 | 0.00116 | 0.000417574 |
| 37 | 101 | 3.08E−05 | 0.000308 | 0.000417218 |
| 38 | 465 | 0.000141612 | 0.001416 | 0.000417681 |
| 39 | 115 | 3.50E−05 | 0.00035 | 0.000417236 |
| 40 | 475 | 0.000144658 | 0.001447 | 0.000417694 |
| 41 | 126 | 3.84E−05 | 0.000384 | 0.00041725 |
| 42 | 489 | 0.000148921 | 0.001489 | 0.000417711 |
| 43 | 231 | 7.03E−05 | 0.000703 | 0.000417383 |
| 44 | 525 | 0.000159885 | 0.001599 | 0.000417757 |
| 45 | 419 | 0.000127603 | 0.001276 | 0.000417622 |
| 46 | 515 | 0.00015684 | 0.001568 | 0.000417745 |
| 47 | 505 | 0.000153794 | 0.001538 | 0.000417732 |
| 48 | 494 | 0.000150444 | 0.001504 | 0.000417718 |
| 49 | 439 | 0.000133694 | 0.001337 | 0.000417648 |
| 50 | 425 | 0.000129431 | 0.001294 | 0.00041763 |
| 51 | 458 | 0.000139481 | 0.001395 | 0.000417672 |
| 52 | 457 | 0.000139176 | 0.001392 | 0.000417671 |
| 53 | 423 | 0.000128822 | 0.001288 | 0.000417628 |
| 54 | 483 | 0.000147094 | 0.001471 | 0.000417704 |
| 55 | 445 | 0.000135522 | 0.001355 | 0.000417655 |
| 56 | 499 | 0.000151967 | 0.00152 | 0.000417724 |
| 57 | 487 | 0.000148312 | 0.001483 | 0.000417709 |
| 58 | 492 | 0.000149835 | 0.001498 | 0.000417715 |
| 59 | 509 | 0.000155012 | 0.00155 | 0.000417737 |
| 60 | 499 | 0.000151967 | 0.00152 | 0.000417724 |
| 61 | 472 | 0.000143744 | 0.001437 | 0.00041769 |
| 62 | 530 | 0.000161408 | 0.001614 | 0.000417764 |
| 63 | 543 | 0.000165367 | 0.001654 | 0.00041778 |
| 64 | 765 | 0.000232975 | 0.00233 | 0.000418063 |
| 65 | 256 | 7.80E−05 | 0.00078 | 0.000417415 |
| 66 | 765 | 0.000232975 | 0.00233 | 0.000418063 |
| 67 | 255 | 7.77E−05 | 0.000777 | 0.000417414 |
| 68 | 781 | 0.000237848 | 0.002378 | 0.000418083 |
| 69 | 283 | 8.62E−05 | 0.000862 | 0.000417449 |
| 70 | 794 | 0.000241807 | 0.002418 | 0.0004181 |
| 71 | 252 | 7.67E−05 | 0.000767 | 0.00041741 |
| 72 | 723 | 0.000220184 | 0.002202 | 0.000418009 |
| 73 | 205 | 6.24E−05 | 0.000624 | 0.00041735 |
| 74 | 679 | 0.000206785 | 0.002068 | 0.000417953 |
| 75 | 216 | 6.58E−05 | 0.000658 | 0.000417364 |
| 76 | 661 | 0.000201303 | 0.002013 | 0.00041793 |
| 77 | 247 | 7.52E−05 | 0.000752 | 0.000417404 |
| 78 | 753 | 0.000229321 | 0.002293 | 0.000418047 |
| 79 | 253 | 7.70E−05 | 0.00077 | 0.000417411 |
| 80 | 791 | 0.000240893 | 0.002409 | 0.000418096 |
| 81 | 269 | 8.19E−05 | 0.000819 | 0.000417432 |
| 82 | 788 | 0.00023998 | 0.0024 | 0.000418092 |
| 83 | 264 | 8.04E−05 | 0.000804 | 0.000417425 |
| 84 | 908 | 0.000276525 | 0.002765 | 0.000418245 |
| 85 | 320 | 9.75E−05 | 0.000975 | 0.000417497 |
| 86 | 889 | 0.000270739 | 0.002707 | 0.000418221 |
| 87 | 332 | 0.000101108 | 0.001011 | 0.000417512 |
| 88 | 1008 | 0.000306979 | 0.00307 | 0.000418372 |
| 89 | 321 | 9.78E−05 | 0.000978 | 0.000417498 |
| 90 | 1047 | 0.000318856 | 0.003189 | 0.000418422 |
| 91 | 325 | 9.90E−05 | 0.00099 | 0.000417503 |
| 92 | 1052 | 0.000320379 | 0.003204 | 0.000418428 |
| 93 | 320 | 9.75E−05 | 0.000975 | 0.000417497 |
| 94 | 1099 | 0.000334693 | 0.003347 | 0.000418488 |
| 95 | 367 | 0.000111767 | 0.001118 | 0.000417556 |
| 96 | 1104 | 0.000336215 | 0.003362 | 0.000418495 |
| 97 | 329 | 0.000100195 | 0.001002 | 0.000417508 |
| 98 | 1176 | 0.000358142 | 0.003581 | 0.000418586 |
| 99 | 370 | 0.000112681 | 0.001127 | 0.00041756 |
| 100 | 1219 | 0.000371238 | 0.003712 | 0.000418641 |
| 101 | 401 | 0.000122122 | 0.001221 | 0.0004176 |
| 102 | 1216 | 0.000370324 | 0.003703 | 0.000418637 |
| 103 | 445 | 0.000135522 | 0.001355 | 0.000417655 |
| 104 | 1354 | 0.000412351 | 0.004124 | 0.000418813 |
| 105 | 532 | 0.000162017 | 0.00162 | 0.000417766 |
| 106 | 1505 | 0.000458337 | 0.004583 | 0.000419006 |
| 107 | 695 | 0.000211657 | 0.002117 | 0.000417974 |
| 108 | 1752 | 0.000533559 | 0.005336 | 0.000419321 |
| 109 | 907 | 0.00027622 | 0.002762 | 0.000418244 |
| 110 | 2066 | 0.000629185 | 0.006292 | 0.000419722 |
| 111 | 964 | 0.000293579 | 0.002936 | 0.000418316 |
| 112 | 2146 | 0.000653549 | 0.006535 | 0.000419825 |
| 113 | 1166 | 0.000355097 | 0.003551 | 0.000418574 |
| 114 | 2397 | 0.000729989 | 0.0073 | 0.000420146 |
| 115 | 1259 | 0.000383419 | 0.003834 | 0.000418692 |
| 116 | 2616 | 0.000796684 | 0.007967 | 0.000420426 |
| 117 | 1352 | 0.000411742 | 0.004117 | 0.000418811 |
| 118 | 2651 | 0.000807343 | 0.008073 | 0.000420471 |
| 119 | 1493 | 0.000454682 | 0.004547 | 0.000418991 |
| 120 | 2703 | 0.000823179 | 0.008232 | 0.000420537 |
| 121 | 1709 | 0.000520464 | 0.005205 | 0.000419266 |
| 122 | 2743 | 0.000835361 | 0.008354 | 0.000420589 |
| 123 | 1822 | 0.000554877 | 0.005549 | 0.000419411 |
| 124 | 2695 | 0.000820743 | 0.008207 | 0.000420527 |
| 125 | 1960 | 0.000596904 | 0.005969 | 0.000419587 |
| 126 | 2821 | 0.000859115 | 0.008591 | 0.000420689 |
| 127 | 2250 | 0.000685221 | 0.006852 | 0.000419958 |
| 128 | 3065 | 0.000933424 | 0.009334 | 0.000421001 |
| 129 | 2452 | 0.000746739 | 0.007467 | 0.000420216 |
| 130 | 3533 | 0.00107595 | 0.01076 | 0.000421602 |
| 131 | 2675 | 0.000814652 | 0.008147 | 0.000420502 |
| 132 | 3819 | 0.00116305 | 0.011631 | 0.000421969 |
| 133 | 3406 | 0.00103727 | 0.010373 | 0.000421439 |
| 134 | 4413 | 0.00134395 | 0.01344 | 0.000422733 |
| 135 | 3903 | 0.00118863 | 0.011886 | 0.000422077 |
| 136 | 4558 | 0.00138811 | 0.013881 | 0.000422292 |
| 137 | 4141 | 0.00126111 | 0.012611 | 0.000422383 |
| 138 | 4346 | 0.00132354 | 0.013235 | 0.000422647 |
| 139 | 4247 | 0.00129339 | 0.012934 | 0.00042252 |
| 140 | 4397 | 0.00133907 | 0.013391 | 0.000422713 |
| 141 | 4230 | 0.00128822 | 0.012882 | 0.000422498 |
| 142 | 4035 | 0.00122883 | 0.012288 | 0.000422247 |
| 143 | 3588 | 0.0010927 | 0.010927 | 0.000421672 |
| 144 | 3306 | 0.00100682 | 0.010068 | 0.000422131 |
| 145 | 3301 | 0.0010053 | 0.010053 | 0.000421304 |
| 146 | 3298 | 0.00100438 | 0.010044 | 0.0004213 |
| 147 | 3225 | 0.00098215 | 0.009822 | 0.000421206 |
| 148 | 3081 | 0.000938296 | 0.009383 | 0.000421022 |
| 149 | 3029 | 0.00092246 | 0.009225 | 0.000420955 |
| 150 | 3023 | 0.000920633 | 0.009206 | 0.000420947 |
| 151 | 3004 | 0.000914846 | 0.009148 | 0.000420923 |
| 152 | 2775 | 0.000845106 | 0.008451 | 0.000420063 |
| 153 | 2647 | 0.000806125 | 0.008061 | 0.000420466 |
| 154 | 2497 | 0.000760443 | 0.007604 | 0.000420274 |
| 155 | 2607 | 0.000793943 | 0.007939 | 0.000420414 |
| 156 | 2635 | 0.00080247 | 0.008025 | 0.00042045 |
| 157 | 2579 | 0.000785416 | 0.007854 | 0.000420379 |
| 158 | 2642 | 0.000804602 | 0.008046 | 0.000420459 |
| 159 | 2646 | 0.00080582 | 0.008058 | 0.000420464 |
| 160 | 2756 | 0.00083932 | 0.008393 | 0.000420605 |
| 161 | 2986 | 0.000909365 | 0.009094 | 0.00042090 |
| 162 | 3272 | 0.000996464 | 0.009965 | 0.000421267 |
| 163 | 3398 | 0.00103484 | 0.010348 | 0.000421428 |
| 164 | 3752 | 0.00114264 | 0.011426 | 0.000421883 |
| 165 | 4072 | 0.0012401 | 0.012401 | 0.000422294 |
| 166 | 4574 | 0.00139298 | 0.01393 | 0.00042294 |
| 167 | 4923 | 0.00149926 | 0.014993 | 0.00042339 |
| 168 | 5022 | 0.00152941 | 0.015294 | 0.000423518 |
| 169 | 5254 | 0.00160007 | 0.016001 | 0.000423817 |
| 170 | 5136 | 0.00156413 | 0.015641 | 0.000423665 |
| 171 | 4882 | 0.00148678 | 0.014868 | 0.000423337 |
| 172 | 4513 | 0.0013744 | 0.013744 | 0.000422862 |
| 173 | 4034 | 0.00122853 | 0.012285 | 0.000422246 |
| 174 | 3740 | 0.00113899 | 0.01139 | 0.000421868 |

TABLE 1-continued

| PIXEL VALUE | # OCCUR-RENCES | PERCENT [0,1] | SCORE | PROBA-BILITY |
|---|---|---|---|---|
| 175 | 3386 | 0.00103118 | 0.010312 | 0.000421413 |
| 176 | 3125 | 0.000951696 | 0.009517 | 0.000421078 |
| 177 | 2959 | 0.000901142 | 0.009011 | 0.000420865 |
| 178 | 2746 | 0.000836274 | 0.008363 | 0.000420593 |
| 179 | 2677 | 0.000815261 | 0.008153 | 0.000420504 |
| 180 | 2643 | 0.000804907 | 0.008049 | 0.000420461 |
| 181 | 2695 | 0.000820743 | 0.008207 | 0.000420527 |
| 182 | 2604 | 0.000793029 | 0.00793 | 0.000420411 |
| 183 | 2593 | 0.000789679 | 0.007897 | 0.000420397 |
| 184 | 2664 | 0.000811302 | 0.008113 | 0.000420487 |
| 185 | 2636 | 0.000802775 | 0.008028 | 0.000420452 |
| 186 | 2551 | 0.000776889 | 0.007769 | 0.000420343 |
| 187 | 2544 | 0.000774757 | 0.007748 | 0.000420334 |
| 188 | 2560 | 0.000779629 | 0.007796 | 0.000420354 |
| 189 | 2655 | 0.000808561 | 0.008086 | 0.000420476 |
| 190 | 2651 | 0.000807343 | 0.008073 | 0.000420471 |
| 191 | 2711 | 0.000825615 | 0.008256 | 0.000420548 |
| 192 | 2631 | 0.000801252 | 0.008013 | 0.000420445 |
| 193 | 2850 | 0.000867947 | 0.008679 | 0.000420726 |
| 194 | 2827 | 0.000860942 | 0.008609 | 0.000420696 |
| 195 | 2983 | 0.000908451 | 0.009085 | 0.000420896 |
| 196 | 2941 | 0.00089566 | 0.008957 | 0.000420842 |
| 197 | 2944 | 0.000896574 | 0.008966 | 0.000420846 |
| 198 | 3053 | 0.000929769 | 0.009298 | 0.000420986 |
| 199 | 2892 | 0.000880738 | 0.008807 | 0.00042078 |
| 200 | 2935 | 0.000893833 | 0.008938 | 0.000420835 |
| 201 | 2875 | 0.00087556 | 0.008756 | 0.000420758 |
| 202 | 2695 | 0.000820743 | 0.008207 | 0.000420527 |
| 203 | 2665 | 0.000811606 | 0.008116 | 0.000420489 |
| 204 | 2677 | 0.000815261 | 0.008153 | 0.000420504 |
| 205 | 2582 | 0.000786329 | 0.007863 | 0.000420382 |
| 206 | 2473 | 0.000753134 | 0.007531 | 0.000420243 |
| 207 | 2565 | 0.000781152 | 0.007812 | 0.000420361 |
| 208 | 2473 | 0.000753134 | 0.007531 | 0.000420243 |
| 209 | 2442 | 0.000743693 | 0.007437 | 0.000420203 |
| 210 | 2497 | 0.000760443 | 0.007604 | 0.000420274 |
| 211 | 2516 | 0.00076623 | 0.007662 | 0.000420298 |
| 212 | 2590 | 0.000788766 | 0.007888 | 0.000420393 |
| 213 | 2664 | 0.000811302 | 0.008113 | 0.000420487 |
| 214 | 2667 | 0.000812216 | 0.008122 | 0.000420491 |
| 215 | 2809 | 0.000855461 | 0.008555 | 0.000420673 |
| 216 | 2827 | 0.000860942 | 0.008609 | 0.000420696 |
| 217 | 2893 | 0.000881042 | 0.00881 | 0.000420781 |
| 218 | 2895 | 0.000881651 | 0.008817 | 0.000420783 |
| 219 | 3008 | 0.000916065 | 0.009161 | 0.000420928 |
| 220 | 3040 | 0.00092581 | 0.009258 | 0.000420969 |
| 221 | 3237 | 0.000985805 | 0.009858 | 0.000421222 |
| 222 | 3436 | 0.00104641 | 0.010464 | 0.000421477 |
| 223 | 3405 | 0.00103697 | 0.01037 | 0.000421437 |
| 224 | 3604 | 0.00109757 | 0.010976 | 0.000421693 |
| 225 | 3606 | 0.00109818 | 0.010982 | 0.000421696 |
| 226 | 3849 | 0.00117219 | 0.011722 | 0.000422008 |
| 227 | 3753 | 0.00114295 | 0.01143 | 0.000421884 |
| 228 | 3789 | 0.00115391 | 0.011539 | 0.000421931 |
| 229 | 3814 | 0.00116153 | 0.011615 | 0.000421963 |
| 230 | 3920 | 0.00119381 | 0.011938 | 0.000422099 |
| 231 | 3973 | 0.00120995 | 0.0121 | 0.000422167 |
| 232 | 3980 | 0.00121208 | 0.012121 | 0.000422176 |
| 233 | 4195 | 0.00127756 | 0.012776 | 0.000422453 |
| 234 | 4271 | 0.0013007 | 0.013007 | 0.000422255 |
| 235 | 4456 | 0.00135704 | 0.01357 | 0.000422789 |
| 236 | 4422 | 0.00134669 | 0.013467 | 0.000422745 |
| 237 | 4586 | 0.00139663 | 0.013966 | 0.000422956 |
| 238 | 4583 | 0.00139572 | 0.013957 | 0.000422952 |
| 239 | 4847 | 0.00147612 | 0.014761 | 0.000423292 |
| 240 | 5094 | 0.00155134 | 0.015513 | 0.000423611 |
| 241 | 5020 | 0.0015288 | 0.015288 | 0.000423515 |
| 242 | 5223 | 0.00159063 | 0.015906 | 0.000423777 |
| 243 | 5844 | 0.00177975 | 0.017798 | 0.000424579 |
| 244 | 6455 | 0.00196582 | 0.019658 | 0.00042537 |
| 245 | 6561 | 0.00199811 | 0.019981 | 0.000425508 |
| 246 | 7543 | 0.00229717 | 0.022972 | 0.000426782 |
| 247 | 8316 | 0.00253258 | 0.025326 | 0.000427788 |
| 248 | 9481 | 0.00288737 | 0.028874 | 0.000429308 |
| 249 | 11265 | 0.00343067 | 0.034307 | 0.000431647 |
| 250 | 13816 | 0.00420756 | 0.042076 | 0.000435014 |
| 251 | 17137 | 0.00521895 | 0.05219 | 0.000439436 |
| 252 | 23426 | 0.00713422 | 0.071342 | 0.000447933 |
| 253 | 38664 | 0.0117748 | 0.117748 | 0.00046921 |
| 254 | 145656 | 0.0443585 | 0.443585 | 0.000649944 |
| 255 | 2521280 | 0.767838 | 7.67838 | 0.901376 |

TABLE 2 below shows an example histogram and non-linear probability distribution of one of the three channels for a relatively dirty (i.e., noisy) image. TABLE 2 is based on the same format as TABLE 1 above.

Based on TABLE 2 and using 0.99 as the percentage threshold, the width of the peak is computed as [200,215] based on the percentage distribution in the third column of TABLE 1, while the width of the peak is computed as [193,220] based on the probability distribution in the fifth column of TABLE 1. Because [193,220] is wider than [200,215], the probability distribution based noise reduction with a wider replacement range results in more aggressive noise reduction in the relatively dirty (i.e., noisy) image.

TABLE 2

| PIXEL VALUE | # OCCUR-RENCES | PERCENT [0,1] | SCORE | PROBA-BILITY |
|---|---|---|---|---|
| 193 | 256 | 4.10E-05 | 0.000409571 | 0.0232644 |
| 196 | 1040 | 0.000166388 | 0.00166388 | 0.0232936 |
| 197 | 2320 | 0.000371174 | 0.00371174 | 0.0233414 |
| 198 | 10155 | 0.00162469 | 0.0162469 | 0.0236358 |
| 199 | 21749 | 0.0034796 | 0.034796 | 0.0240783 |
| 200 | 48646 | 0.00778282 | 0.0778282 | 0.0251371 |
| 201 | 115044 | 0.0184058 | 0.184058 | 0.0279544 |
| 202 | 202024 | 0.0323216 | 0.323216 | 0.0321281 |
| 203 | 345091 | 0.0552107 | 0.552107 | 0.0403917 |
| 204 | 492189 | 0.0787448 | 0.787448 | 0.0511092 |
| 205 | 655778 | 0.104917 | 1.04917 | 0.0663994 |
| 206 | 774370 | 0.123891 | 1.23891 | 0.0802721 |
| 207 | 815381 | 0.130452 | 1.30452 | 0.0857156 |
| 208 | 795752 | 0.127311 | 1.27311 | 0.0830656 |
| 209 | 680233 | 0.10883 | 1.0883 | 0.0690488 |
| 210 | 525743 | 0.084113 | 0.84113 | 0.0539278 |
| 211 | 342586 | 0.0548099 | 0.548099 | 0.0402301 |
| 212 | 211148 | 0.0337813 | 0.337813 | 0.0326006 |
| 213 | 109764 | 0.017561 | 0.17561 | 0.0277192 |
| 214 | 62106 | 0.00993627 | 0.0993627 | 0.0256843 |
| 215 | 23556 | 0.0037687 | 0.037687 | 0.024148 |
| 216 | 8722 | 0.00139542 | 0.0139542 | 0.0235817 |
| 217 | 5250 | 0.000839942 | 0.00839942 | 0.0234511 |
| 218 | 1023 | 0.000163669 | 0.00163669 | 0.023293 |
| 219 | 256 | 4.10E-05 | 0.000409571 | 0.0232644 |
| 220 | 253 | 4.05E-05 | 0.000404772 | 0.0232643 |

Based on the replacement range [193,220], all pixels in the page background CC (310) having pixel values within [193,220] are converted to the uniform background color to reduce the image noises. The noise reduced version of the original input image (300) is shown in FIG. 3B below.

FIG. 3B shows an example of the noise reduced version of the original input image (300) depicted in FIG. 3A above. As shown in FIG. 3B, the cleaned image (330) is the noise reduced version of the original input image (300). In particular, the portion (331) of the cleaned image (330) corresponds to the portion (301) of the original input image (300). The portion (331) is magnified as the enlarged portion (331a) where it can be seen that the visible color variations (e.g., represented as gray-scale tone variation (302) depicted in FIG. 3A) is absent in the cleaned image (330). The cleaned pixels (311) show noise reduction locations superimposed onto the binary mask of the page background CC (310) depicted in FIG. 3A above. Specifically, the black dots scattered over the cleaned pixels (311) represent noise pixels where the color variations are converted to the uniform background color.

An enhancement of the noise reduction is to apply the technique described above to each quadrant, octant, etc., rather than to the entire document image as a whole. The enhancement improves noise reduction when there is a gradient distribution of noise across the document image.

Figure 4:
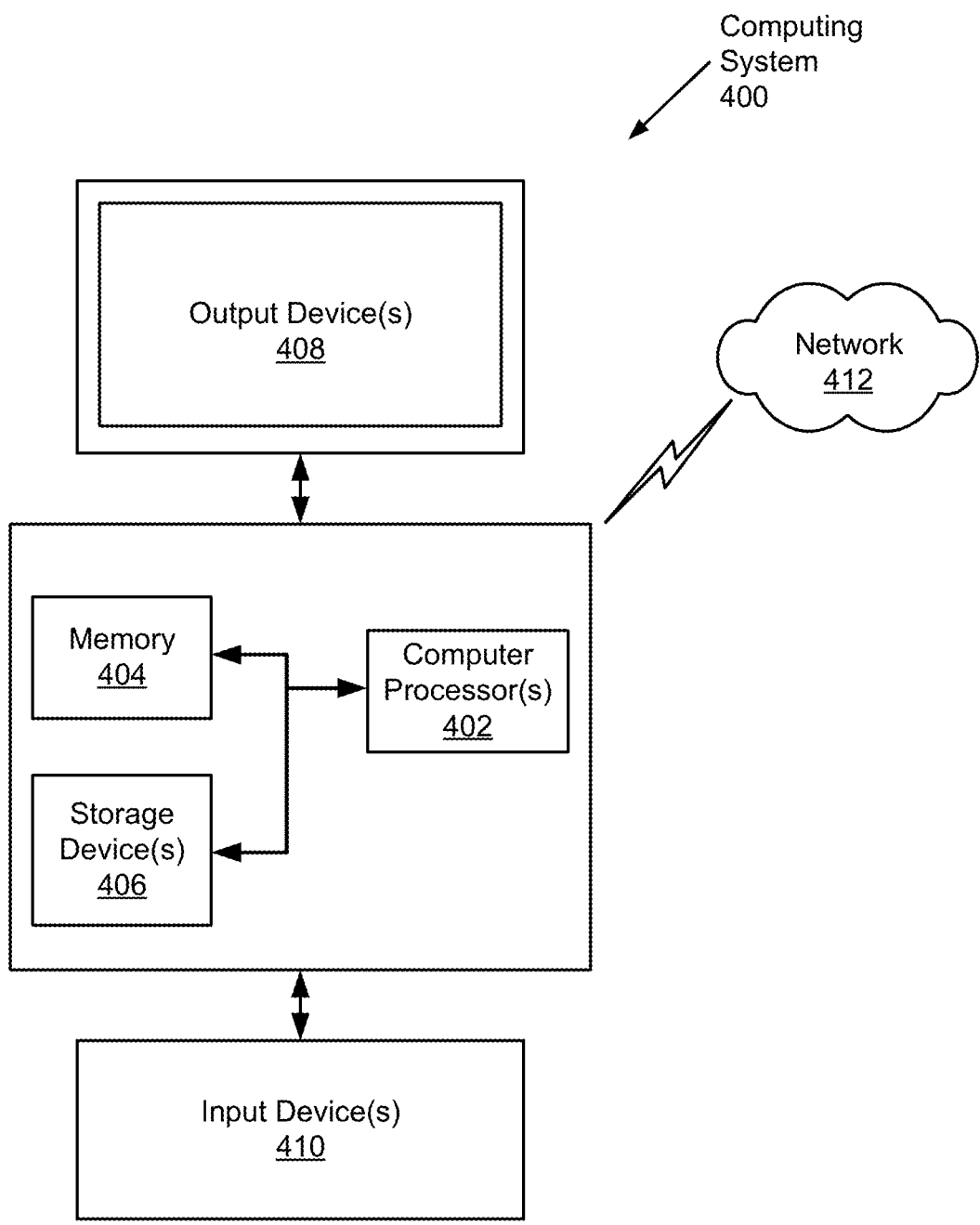
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the following improvements in document image background noise reduction technologies: allowing noisier backgrounds to be more aggressively cleaned than cleaner backgrounds in the document image, and reducing the risk in degrading actual content in a cleaner image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to reduce background noise in a document image, the method comprising:
    extracting, by a computer processor and from the document image, a connected component corresponding to a background of the document image;
    generating, by the computer processor, a first histogram of pixel values of the connected component;
    generating, by the computer processor using a non-linear mapping function based on the first histogram, a first non-linear probability distribution of the pixel values in the connected component;
    generating, based at least on a comparison between the first non-linear probability distribution and a predetermined threshold, a first replacement range of the pixel values;
    selecting, from the connected component, a first pixel having a first pixel value within the first replacement range; and
    converting the first pixel value of the first pixel to a uniform background color.

2. The method of claim 1, further comprising:
    identifying a dominant pixel value in the first histogram of pixel values as the uniform background color,
    wherein the dominant pixel value corresponds to a maximum pixel count in the first histogram of pixel values.

3. The method of claim 1, wherein extracting the connected component comprises:
    extracting a plurality of connected components from the document image;
    comparing a dimension of the document image to the plurality of connected components to generate a comparison result; and
    selecting, based on the comparison result, the connected component from the plurality of connected components as corresponding to the background of the document image.

4. The method of claim 1, wherein generating the first non-linear probability distribution comprises:
    applying the non-linear mapping function to each pixel count in the first histogram of the pixel values.

5. The method of claim 4, wherein the non-linear mapping function comprises an exponential function.

6. The method of claim 1, further comprising:
    reducing, prior to selecting the first pixel having the first pixel value within the first replacement range, the first replacement range by discarding pixel values with probabilities less than a predetermined threshold.

7. The method of claim 1, further comprising:
identifying a first portion and a second portion of the connected component, wherein
the first histogram corresponds to the first portion of the connected component, and
the first pixel is selected from the first portion of the connected component;
generating a second histogram of pixel values of the second portion of the connected component;
generating, using the non-linear mapping function based on the second histogram, a second non-linear probability distribution of the pixel values in the second portion of the connected component;
generating, based at least on a comparison between the second non-linear probability distribution and the predetermined threshold, a second replacement range of the pixel values;
selecting, from the second portion of the connected component, a second pixel having a second pixel value within the second replacement range; and
converting the second pixel value of the second pixel to the uniform background color,
wherein the first portion and the second portion of the connected component have different amount of background noise.

8. A system for reducing background noise in a document image, the system comprising:
a memory; and
a computer processor connected to the memory and that:
extracts, from the document image, a connected component corresponding to a background of the document image;
generates a first histogram of pixel values of the connected component;
generates, using a non-linear mapping function based on the first histogram, a first non-linear probability distribution of the pixel values in the connected component;
generates, based at least on a comparison between the first non-linear probability distribution and a predetermined threshold, a first replacement range of the pixel values;
selects, from the connected component, a first pixel having a first pixel value within the first replacement range; and
converts the first pixel value of the first pixel to a uniform background color.

9. The system of claim 8, wherein the computer processor further:
identifies a dominant pixel value in the first histogram of pixel values as the uniform background color,
wherein the dominant pixel value corresponds to a maximum pixel count in the first histogram of pixel values.

10. The system of claim 8, wherein extracting the connected component comprises:
extracting a plurality of connected components from the document image;
comparing a dimension of the document image to the plurality of connected components to generate a comparison result; and
selecting, based on the comparison result, the connected component from the plurality of connected components as corresponding to the background of the document image.

11. The system of claim 8, wherein generating the first non-linear probability distribution comprises:
applying the non-linear mapping function to each pixel count in the first histogram of the pixel values.

12. The system of claim 11, wherein the non-linear mapping function comprises an exponential function.

13. The system of claim 8, wherein the computer processor further:
reduces, prior to selecting the first pixel having the first pixel value within the first replacement range, the first replacement range by discarding pixel values with probabilities less than a predetermined threshold.

14. The system of claim 8, wherein the computer processor further:
identifies a first portion and a second portion of the connected component, wherein
the first histogram corresponds to the first portion of the connected component, and
the first pixel is selected from the first portion of the connected component;
generates a second histogram of pixel values of the second portion of the connected component;
generates, using the non-linear mapping function based on the second histogram, a second non-linear probability distribution of the pixel values in the second portion of the connected component;
generates, based at least on a comparison between the second non-linear probability distribution and the predetermined threshold, a second replacement range of the pixel values;
selects, from the second portion of the connected component, a second pixel having a second pixel value within the second replacement range; and
converts the second pixel value of the second pixel to the uniform background color,
wherein the first portion and the second portion of the connected component have different amount of background noise.

15. A non-transitory computer readable medium (CRM) storing computer readable program code for reducing background noise in a document image, wherein the computer readable program code, when executed by a computer, comprises functionality for:
extracting, from the document image, a connected component corresponding to a background of the document image;
generating a first histogram of pixel values of the connected component;
generating, using a non-linear mapping function based on the first histogram, a first non-linear probability distribution of the pixel values in the connected component;
generating, based at least on a comparison between the first non-linear probability distribution and a predetermined threshold, a first replacement range of the pixel values;
selecting, from the connected component, a first pixel having a first pixel value within the first replacement range; and
converting the first pixel value of the first pixel to a uniform background color.

16. The non-transitory CRM of claim 15, wherein the computer readable program code, when executed by the computer, further comprises functionality for:
identifying a dominant pixel value in the first histogram of pixel values as the uniform background color,
wherein the dominant pixel value corresponds to a maximum pixel count in the first histogram of pixel values.

17. The non-transitory CRM of claim 15, wherein extracting the connected component comprises:

extracting a plurality of connected components from the document image;

comparing a dimension of the document image to the plurality of connected components to generate a comparison result; and selecting, based on the comparison result, the connected component from the plurality of connected components as corresponding to the background of the document image.

18. The non-transitory CRM of claim 15, wherein generating the first non-linear probability distribution comprises:

applying the non-linear mapping function to each pixel count in the first histogram of the pixel values.

19. The non-transitory CRM of claim 18, wherein the computer readable program code, when executed by the computer, further comprises functionality for:

reducing, prior to selecting the first pixel having the first pixel value within the first replacement range, the first replacement range by discarding pixel values with probabilities less than a predetermined threshold.

20. The non-transitory CRM of claim 15, wherein the computer readable program code, when executed by the computer, further comprises functionality for:

identifying a first portion and a second portion of the connected component, wherein
the first histogram corresponds to the first portion of the connected component, and
the first pixel is selected from the first portion of the connected component;

generating a second histogram of pixel values of the second portion of the connected component;

generating, using the non-linear mapping function based on the second histogram, a second non-linear probability distribution of the pixel values in the second portion of the connected component;

generating, based at least on a comparison between the second non-linear probability distribution and the predetermined threshold, a second replacement range of the pixel values;

selecting, from the second portion of the connected component, a second pixel having a second pixel value within the second replacement range; and converting the second pixel value of the second pixel to the uniform background color, wherein the first portion and the second portion of the connected component have different amount of background noise.

* * * * *